(12) United States Patent
Wilkerson

(10) Patent No.: US 8,464,219 B1
(45) Date of Patent: Jun. 11, 2013

(54) SCALABLE CONTROL SYSTEM FOR TEST EXECUTION AND MONITORING UTILIZING MULTIPLE PROCESSORS

(75) Inventor: Brian Wilkerson, Aptos, CA (US)

(73) Assignee: Spirent Communications, Inc., Sunnyvale, CA (US)

( * ) Notice: Subject to any disclaimer, the term of this patent is extended or adjusted under 35 U.S.C. 154(b) by 161 days.

(21) Appl. No.: 13/095,807

(22) Filed: Apr. 27, 2011

(51) Int. Cl.
*G06F 9/44* (2006.01)
(52) U.S. Cl.
USPC ............................................. 717/120; 717/121
(58) Field of Classification Search
USPC .................................. 717/100, 120, 121, 124
See application file for complete search history.

(56) References Cited

U.S. PATENT DOCUMENTS

| | | | |
|---|---|---|---|
| 5,067,104 A | 11/1991 | Krishnakumar et al. |
| 5,459,837 A | 10/1995 | Caccavale |
| 5,485,409 A | 1/1996 | Gupta et al. |
| 5,892,903 A | 4/1999 | Klaus |
| 6,088,804 A | 7/2000 | Hill et al. |
| 6,324,656 B1 | 11/2001 | Gleichauf et al. |
| 6,363,477 B1 | 3/2002 | Fletcher et al. |
| 6,574,737 B1 | 6/2003 | Kingsford et al. |
| 6,584,569 B2 | 6/2003 | Reshef et al. |
| 6,609,205 B1 | 8/2003 | Bernhard et al. |
| 6,654,914 B1 | 11/2003 | Kaffine et al. |
| 6,952,779 B1 | 10/2005 | Cohen et al. |
| 7,152,105 B2 | 12/2006 | McClure et al. |
| 7,159,151 B2 | 1/2007 | Morgan et al. |
| 7,178,166 B1 | 2/2007 | Taylor et al. |
| 7,185,232 B1 | 2/2007 | Leavy et al. |
| 7,243,148 B2 | 7/2007 | Keir et al. |
| 7,257,630 B2 | 8/2007 | Cole et al. |

(Continued)

FOREIGN PATENT DOCUMENTS

WO 2006/099536 9/2006

OTHER PUBLICATIONS

Wagner, D. et al., "Intrusion Detection Via Static Analysis", IEEE Symposium on Security and Privacy, 2001, pp. 156-168.

(Continued)

*Primary Examiner* — Anna Deng
(74) *Attorney, Agent, or Firm* — Haynes Beffel & Wolfeld LLP; Ernest J. Beffel, Jr.

(57) ABSTRACT

Various example embodiments are directed to systems and methods for managing a plurality of distributed test engines to test at least one device under analysis (DUA). A controller and a control database may be used to manage the plurality of test engines. The control database may have stored thereon a plurality of configuration documents, a plurality of instruction documents, and at least one statistics document. Each configuration document may be associated with at least one of the plurality of test engines and may indicate an execution group of the associated at least one test engine. Each instruction document may be associated with an execution group and may comprise an indication of a testing task to be performed by the execution group associated with the instruction document. The controller may be configured to write to the plurality of configuration documents to assign each of the plurality of test engines to an execution group; write to the plurality of instruction documents to provide, for each execution group, a testing task to be performed by test engines of the execution group on the at least one DUA. The control database may configured to receive from at least a portion of a plurality of test engines an update to the at least one statistics document.

23 Claims, 8 Drawing Sheets

U.S. PATENT DOCUMENTS

| | | |
|---|---|---|
| 7,272,650 B2 | 9/2007 | Elgebaly et al. |
| 7,290,145 B2 | 10/2007 | Falkenthros |
| 7,315,801 B1 | 1/2008 | Dowd et al. |
| 7,342,892 B2 | 3/2008 | Soon et al. |
| 7,346,922 B2 | 3/2008 | Miliefsky |
| 7,412,621 B2 | 8/2008 | Choi |
| 7,421,621 B1 | 9/2008 | Zambrana |
| 7,447,966 B2 | 11/2008 | Kamannavar et al. |
| 7,451,488 B2 | 11/2008 | Cooper et al. |
| 7,471,999 B2 | 12/2008 | Taki |
| 7,509,675 B2 | 3/2009 | Aaron |
| 7,512,125 B2 | 3/2009 | Betts et al. |
| 7,536,456 B2 | 5/2009 | Williams et al. |
| 7,536,605 B2 | 5/2009 | Keaffaber et al. |
| 7,543,056 B2 | 6/2009 | McClure et al. |
| 7,607,170 B2 | 10/2009 | Chesla |
| 7,624,422 B2 | 11/2009 | Williams et al. |
| 7,627,891 B2 | 12/2009 | Williams et al. |
| 7,627,900 B1 | 12/2009 | Noel et al. |
| 7,664,845 B2 | 2/2010 | Kurtz et al. |
| 7,673,043 B2 | 3/2010 | Keir et al. |
| 7,774,637 B1 | 8/2010 | Beddoe et al. |
| 7,917,820 B1* | 3/2011 | Pavle et al. .................. 714/727 |
| 7,954,161 B1 | 5/2011 | Guruswamy et al. |
| 7,958,230 B2 | 6/2011 | Guruswamy et al. |
| 7,958,560 B1 | 6/2011 | Guruswamy |
| 2001/0034847 A1 | 10/2001 | Gaul, Jr. |
| 2002/0157041 A1 | 10/2002 | Bennett et al. |
| 2003/0051163 A1 | 3/2003 | Bidaud |
| 2003/0154399 A1 | 8/2003 | Zuk et al. |
| 2003/0159063 A1 | 8/2003 | Apfelbaum et al. |
| 2004/0001443 A1 | 1/2004 | Soon et al. |
| 2004/0068586 A1 | 4/2004 | Xie et al. |
| 2004/0068675 A1 | 4/2004 | Liu |
| 2004/0103315 A1 | 5/2004 | Cooper et al. |
| 2004/0205557 A1 | 10/2004 | Bahrs et al. |
| 2004/0230881 A1 | 11/2004 | Gwak |
| 2005/0015213 A1 | 1/2005 | Somervill et al. |
| 2005/0044418 A1 | 2/2005 | Miliefsky |
| 2005/0135391 A1 | 6/2005 | Sung |
| 2005/0144137 A1 | 6/2005 | Kumar et al. |
| 2005/0193103 A1* | 9/2005 | Drabik .......................... 709/221 |
| 2005/0195820 A1 | 9/2005 | Betts et al. |
| 2005/0248457 A1 | 11/2005 | Himberger et al. |
| 2005/0273772 A1 | 12/2005 | Matsakis et al. |
| 2005/0273854 A1 | 12/2005 | Chess et al. |
| 2005/0273859 A1 | 12/2005 | Chess et al. |
| 2006/0005231 A1 | 1/2006 | Zuk et al. |
| 2006/0015941 A1 | 1/2006 | McKenna |
| 2006/0015943 A1 | 1/2006 | Mahieu |
| 2006/0021034 A1 | 1/2006 | Cook |
| 2006/0021044 A1 | 1/2006 | Cook |
| 2006/0021045 A1 | 1/2006 | Cook |
| 2006/0021046 A1 | 1/2006 | Cook |
| 2006/0021047 A1 | 1/2006 | Cook |
| 2006/0021048 A1 | 1/2006 | Cook et al. |
| 2006/0021049 A1 | 1/2006 | Cook |
| 2006/0036755 A1 | 2/2006 | Abdullah et al. |
| 2006/0036999 A1* | 2/2006 | Fay et al. ....................... 717/120 |
| 2006/0080733 A1 | 4/2006 | Khosmood et al. |
| 2006/0085723 A1 | 4/2006 | Bartz et al. |
| 2006/0098579 A1 | 5/2006 | Chang et al. |
| 2006/0106939 A1 | 5/2006 | Cha et al. |
| 2006/0137009 A1 | 6/2006 | Chesla |
| 2006/0277606 A1 | 12/2006 | Yunus et al. |
| 2007/0006037 A1 | 1/2007 | Sargusingh et al. |
| 2007/0006153 A1* | 1/2007 | Sultan ........................... 717/124 |
| 2007/0011319 A1 | 1/2007 | McClure et al. |
| 2007/0086389 A1 | 4/2007 | Park et al. |
| 2007/0094728 A1 | 4/2007 | Julisch et al. |
| 2007/0115962 A1 | 5/2007 | Mammoliti et al. |
| 2007/0174917 A1 | 7/2007 | Guruswamy |
| 2007/0204347 A1 | 8/2007 | Caceres et al. |
| 2008/0005555 A1 | 1/2008 | Lotem et al. |
| 2008/0072322 A1 | 3/2008 | Guruswamy |
| 2008/0092237 A1 | 4/2008 | Yoon et al. |
| 2008/0098479 A1 | 4/2008 | O'Rourke et al. |
| 2008/0120283 A1 | 5/2008 | Liu et al. |
| 2008/0155338 A1 | 6/2008 | Rusmanov |
| 2008/0282352 A1 | 11/2008 | Beddoe et al. |
| 2009/0083854 A1 | 3/2009 | Bozanich et al. |
| 2009/0271863 A1 | 10/2009 | Govindavajhala et al. |
| 2009/0320137 A1 | 12/2009 | White et al. |
| 2009/0328190 A1 | 12/2009 | Liu et al. |
| 2010/0106742 A1 | 4/2010 | Guruswamy |
| 2010/0213957 A1* | 8/2010 | Richmond et al. ............ 324/754 |
| 2010/0284282 A1 | 11/2010 | Golic |
| 2010/0284283 A1 | 11/2010 | Golic et al. |
| 2010/0293415 A1 | 11/2010 | Beddoe et al. |

OTHER PUBLICATIONS

Finlay, I. et al., "Multiple Vulnerabilities in Many Implementations of the Simple Network Management Protocol (SNMP)", CERT® Advisory CA-2002-03, Pittsburgh, PA, US.

Griffin, J.L., "Testing Protocol Implementation Robustness", Published in the Proceedings of 29th Annual International Symposium on Fault-Tolerant Computing (FTC), Jun. 15-18, 1999, Madison, Wisconsin, US.

Kaksonen, R., "A Functional Method for Assessing Protocol Implementation Security", VTT Publications 448, 2011, 128 p.+app. 15p., Technical Research Centre of Finland, FI.

Kaksonen, R., "Software Security Assessment through Specification Mutations and Fault Injection", Proceedings of the Int'l Federation for Information Processing (IFIP), TC-6/TC-11 Fifth Joint Int'l Working Conference on Communications and Multimedia Security (CMS'01), May 21-22, 2001, Darmstadt, Germany, pp. 173-183.

Miller, B. et al., "Fuzz Revisited: A Re-examination of the Reliabiltiy of Unix Utilities and Services", Computer Sciences Department, Oct. 1995, pp. 1-23, Madison, Wisconsin, US.

Protos Test-Suite: c06-snmpvl, University of Oulu (ee.oulu.fi)—http://www.ee.oulu.fi/research/ouspg/protos/testing/c06/snmpvl/index, Oct. 17, 2002, pp. 1-26, Finland.

PROTOS Test-Suite: c06-idapv3, University of Oulu (ee.oulu.fi)—http://www.ee.oulu.fi/research/ouspg/protos/testing/c06/ldapv3/index.html, Dec. 201, p1-13, Finland.

Beddoe, M., "Network Protocol Analysis using Bioinformatics Algorithms", 2004, retrieved on May 17, 2007, from <URL: http://www.4tphi.net/~awalters.PI/pi.pdg>.

Case, J. et al., "A Simple Network Management Protocol (SNMP)" (RFC 1157), May 1990, retrieved on May 17, 2007, from <URL:http://ww.faqs.org/rfcs/rfc1157.html>.

Marquis, S., et al., "SCL: A Language for Security Testing of Network Applications", Proceedings: 15th IBM Centre for Advanced Studies Conference (CASCON), Toronto, Canada, Oct. 2005, pp. 155-164, retrieved on May 17, 2007, from <URL: http://post.queensu.ca/~trd/research/papers/marquisSCL.pdf>.

McCloghrie K. et al., "Structure of Management Information Version 2 (SMIv2)" (RFC 2578), Apr. 1999, retrieved on May 17, 2007, from <URL:http://www.faqs.org/rfcs/rfc2578.html>.

Nevill-Manning, C. et al., "Identifying Hierarchical Structure in Sequences: A linear-time algorithm", Journal of Artificial Intelligence Research, vol. 7, Sep. 1997, pp. 67-82, retrieved on May 17, 2007, from <URL:http://arxiv.org/abs/cs/9709102>.

Tal, O. et al., "Syntax-based Vulnerability Testing of Frame-based Network Protocols", Proceedings: 2nd Annual Conference on Privacy, Security and Trust, Fredericton, Canada, Oct. 2004, pp. 155-160, retrieved on May 17, 2007, from <URL:http://post.queenscu.ca/~trd/research/papers/FinalPST04.pdf>.

Turcotte, Y. et al., "Security Vulnerabilities Assessment of the X.509 Protocol by Syntax-based Testing", Military Communications Conference (MILCOM), Monterey, CA, Oct. 2004, vol. 3, pp. 1572-1578, retrieved from <URL:http://post.queensu.ca/~trd/research/papers/MILCOM.pdf>.

Zhang, S. et al., "A Lightweight Approach to State Based Security Testing", Proceedings: 16th IBM Centre for Advanced Studies Conference (CASCON), Toronto, Canada, Oct. 2006, Article No. 28, retrieved on May 17, 2007, from <URL: http://post.quensu.ca/~trd/research/papers/zhangState.pdf>.

Zhang, S. et al., "Applying Software Transformation Techniques to Security Testing", Proceeding: Software Technology and Engineering in Practice (STEP), Toronto, Canada, Oct. 2005, retrieved on May 17, 2007, from <URL:http://post.queensu.ca/~trd/research/papers/step2005.pdf>.

Aitel, D., "An Introduction to SPIKE, the Fuzzer Creation Kit"(prsentation slides), Aug. 1, 2002, Black Hat USA, Las Vegas, NV, online, retrieved Jun. 26, 2007, from <URL: http://www.blackhat.com/presentations/bh-usa-02/bh-us-02-aitel-spike.ppt>.

Beddoe, M., "Heuristics for Packet Field Identification", Mu Security Research Labs blog, Jan. 4, 2007, online, retrieved Jun. 26, 2007, from <URL: http://labs.musecurity.com/2007/01/04/heuristics-for-packet-field-identification/>.

Beddoe, M., "The Protocol Informatics Project: Automating Network Protocol Analysis" (presentation slides), 2005.

Sonne, B., "Covert Channel detection using Bioinformatics Algorithms", nCircle 360 Security blog, May 11, 2006, online, retrieved on Jun. 26, 2007, from <URL: http://blog.ncircle.com/archives/2006/05/covert_channel_detection_using.html>.

Beizer, B., "Chapter 9: Syntax Testing", in Software Testing Techniques, 2nd Ed., 1990, pp. 284-319, Van Nostrand Reinhold, New York, NY.

Beizer, B., "Chapter 8: Syntax Testing", in Black-Box Testing: Techniques for Functional Testing of Software and Systems, 1995, pp. 177-201, John Wiley & Sons, Inc., New York, NY.

Kaksonen, R. et al., "Vulnerability Analysis of Software through Syntax Testing", 2000, online, retrieved on Sep. 1, 2006, from <URL: http://www.ee.oulu.fi/research/ouspg/protos/analysis/WP2000-robustness/>.

Mu Security, "6 Degrees of Protocols", 2006.

Mu Security, "Protocol Vulnerability Patterns", Apr. 2006.

Rubin, S. et al., "On the Completeness of Attack Mutation Algorithms", 19th IEEE Computer Security Foundations.Workshop (CSFW), Jul. 2006, 14 pages, Online, retrieved on Jan. 19, 2010, from <URL: http://pages.cs.wisc.edu/~jha/jha-papers/security/CSFW_2006.pdf>.

Turcotte, Y., "Syntax Testing of Communication Protocols for Security Vulnerabilities (Testing of a subset of the Entrust PKI)", Nov. 2003, online, retrieved on Sep. 1, 2006, from <URL: http://tarpit.rmc.ca/paul/EEE491A%20Fall%202003/Slides/EE491%20GL3%20Syntax%20Testing.ppt>.

Xiao, S. et al., "Integrated TCP/IP Protocol Software Testing for Vulnerability Detection", Proceedings of International Conference on Computer Networks and Mobile Computing (ICCNMC'03), Oct. 20-23, 2003, Shanghai, China, pp. 311-319.

Bellovin, S. "A Technique for Counting NATted Hosts", Proceedings: Second Internet Measurement Workshop (IMW), Marseille, France, Nov. 6-8, 2002, pp. 267-272.

Bradner, S. et al., "Benchmarking Methodology for Network Interconnect Devices (RFC_1944)", May 1996, online, retrieved on May 12, 2006, from <URL: http://rfc.net/rfc1944.html>.

Bradner, S. et al., Benchmarking Methodology for Network Interconnect Devices (RFC_2544), Mar. 1999, online, retrieved on May 12, 2006, from <URL: http://rfc.net/rfc2544.html>.

Cisco Systems, Inc., "Mobile IP—NAT Detect" in "Cisco IOS IP Mobility Configuration Guide, Release 12.4.", 2005, online, retrieved on May 12, 2006, from <URL:http://www.cisco.com/univercd/cc/td/doc/product/software/ios124/124cg/himo_c/ch05/hnatrav.pdf>.

Dunn, J. et. al., "Methodology for ATM Benchmarking (RFC 3116)", Jun. 2011, online, retrieved on May 12, 2006, from <URL: http://rfc.net/rfc3116.html>.

Egevang, K., et al., "The IP Network Address Translator (NAT) (RFC 1631)", May 1994, online, retrieved on May 12, 2006, from <URL: http://rfc.net/rfc3116.html>.

Microsoft Corp., "Overview of Network Address Translation (NAT) in Windows XP", Sep. 12, 2005, online, retrieved on May 12, 2006, from <URL:http://www.microsoft.com/technet/prodtechnol/winxppro/deploy/nattrnsw.mspx?pd=true>.

Netcom Systems, "SmartWindow User Guide Version 6 53", Document No. 340-1020-001 Rev C, Dec. 1999, online, retrieved on May 12, 2006, from <URL: http://www.cobra.ee.ntu.edu.tw/~oops/HTML6/08_exp/smartbit%20reading.pdf>.

Nikolic, M., "Performance Measurements of Multimedia Transmissions in IP over ATM Networks", Master's Thesis, School of Engineering Science, Simon Fraser University, Dec. 2002, online, retrieved on May 12, 2006, from <URL: http://142.58.111.30/~Ijilja/cnl/pdf/milan.pdf>.

Sorensen, S., "Intrusion Detection and Prevention Protecting Your Network from Attacks", Document No. 200065-002, 2006, online, retrieved on May 12, 2006, from <URL:http://www.juniper.net/solutions/literature/white_papers/200065.pdf.

Srisuresh, P. et al., "IP Network Address Translator (NAT) Terminology and Considerations (RFC 2663)", Aug. 1999, online, retrieved on May 12, 2006, from <URL: http: //rfc/net/rfc2663.html>.

Srisuresh, P. et al., "Traditional IP Network Address Translator (Traditional NAT) (RFC 3022)", Jan. 2001, online, retrieved on May 12, 2006, from <URL: http:rfc.net.rfc3022.html>.

Trend Communications, "RFC 2544 Testing with Aurora Tango", date unknown, online, retrieved on May 12, 2006, from <URL: http://www.trendtest.co.uk/trendweb/resource.nsf/vlFileURL-Lookup/en%5E%5ERFC+2544+testing/$FILE/GbEnet.2544.test.pdf>.

Udupa, R. et al., "Performance Issues and Evaluation Techniques for Networking Devices", 2001, online, retrieved on May 12, 2006, from URL: http://softwaredioxide.com/Channels/events/testing2001/Presentations/reghavendra_infosys.pdf>.

PCT International Search Report and Written Opinion, PCT/US06/09512, Aug. 31, 2006.

* cited by examiner

| | |
|---|---|
| Overview > testengines > bots_10.10.5.88.1 | |
| ⊙ Save Document ⊕ Add Field ⊕ Upload Attachment... ⊗ Delete Document... | |
| | Fields | Source |

| Field | Value |
|---|---|
| 302 — _id | "bots_10.10.5.88.1" |
| 304 — _rev | "430-a7426518a50ccec625e5282cf639c6c8" |
| 306 — ⊗ about | ⊞ capabilities<br>platform "Linux_x86"<br>version "3.0.40241"<br>⊞ interfaces |
| 308 — ⊗ boot_time | "Thu Sep 23 18:14:27 -0700 2010" |
| 310 — ⊗ group | "a" |
| 312 — ⊗ interval | 1 |
| 314 — ⊗ log_level | "DEBUG" |
| 316 — ⊗ logging | false |
| 318 — ⊗ running | true |
| 320 — ⊗ timestamp | 1285290916 |
| 322 — ⊗ type | "bot" |
| 305 — ⊗ version | "0.196" |

Showing revision 430 of 430       ← Previous Version | Next Version →

FIG. 3

| Overview > testengines > instructions_a | |
|---|---|
| ⊘ Save Document ⊕ Add Field ⊕ Upload Attachment... ⊗ Delete Document... | |
| Field | Value |
| _id | "instructions_a" |
| _rev | "109-0795950c45dac31d02cd074a2b4c2da2" |
| ⊗ action | "run" |
| ⊗ group | "a" |
| ⊗ interval | 1 |
| ⊗ job_id | "test run" |
| ⊗ run_params | volume 2<br>⊞ hosts<br>delay 1000<br>csv<br>⊞ musl |
| ⊗ start_time | 1285290862 |
| ⊗ type | "instructions" |
| Showing revision 109 of 109 | ← Previous Version \| Next Version → |

```
114 → Overview > stats-test_run > bots_10.10.5.88.1                              [ ]
        ⊙ Save Document  ⊕ Add Field  ⊕ Upload Attachment...  ⊗ Delete Document...

Fields | Source
       Field              Value
502 —  _id                "bots_10.10.5.88.1"
504 —  _rev               "41-681983c815901bacd141f00d6a71057e"
506 — ⊗ bot_id            "bots_10.10.5.88.1"
508 — ⊗ group             "a"
510 — ⊗ status            running  true
                          ⊟ statistics
                             ⊟ summary
                                ⊟ instances
                                   errors     0
                                   executed  72
                                   total     72
                                   timeouts   0
                                ⊞ asserts
                                ⊞ client
                                ⊞ server
                                duration  46.100573
                             ⊞ scenarios
                          okay  true
512 — ⊗ timestamp         1285290916
514 — ⊗ type              "status"

Showing revision 41 of 41            ← Previous Version | Next Version →
```

SCALABLE CONTROL SYSTEM FOR TEST EXECUTION AND MONITORING UTILIZING MULTIPLE PROCESSORS

BACKGROUND

Computer network testing and monitoring applications are used to identify and protect computer networks, equipment, and/or software from operational and security-related risks. Distributed testing and/or monitoring applications include multiple remote clients controlled by a central controller. Each remote client is instructed to perform all or a portion of a testing and/or monitoring task, such as detecting or simulating a malicious attack, simulating a load, etc.

The remote clients are controlled and coordinated by the central controller using a message-based approach. According to a message-based approach, the controller sends an instruction message or messages to each remote client for each action, or portion thereof, that the remote client is to perform. The remote clients must provide the controller with a response to each message to validate the success or failure of the request. Some existing systems limit the volume of required messages somewhat by using a multicast protocol from the controller to all remote clients. The controller obtains feedback from the remote clients using a polling scheme. According to a polling scheme, the controller solicits feedback from each client with directed or multicast messages. Protocols for client-controller communications are typically proprietary, increasing the costs of system development. Further, the rate of message exchange between the controller and the remote client may be limited based on the processing capacity of the central controller as well as the capacity of its network access interface.

Practically, limitations on message volume limit the number of remote clients that may be used in distributed testing and monitoring applications. For example, keeping track of the status of multiple remote clients may tax the processing capacity of the central controller, causing it to fall behind and knock the system out of synchronization. Also, control messages for message-based distributed testing and monitoring applications may not easily pass through firewalls, placing additional practical limitations on the usefulness of the systems.

FIGURES

Various example embodiments of the present invention are described here by way of example in conjunction with the following figures, wherein:

FIG. 3 illustrates a representation of one example embodiment of a configuration document for a single test engine.

FIG. 4 illustrates a representation of one example embodiment of an instruction document for a group of test engines.

FIG. 5 illustrates a representation of one example embodiment of a statistics document.

DESCRIPTION

Various example embodiments may be directed to systems and methods for distributed testing and monitoring applications. A plurality of distributed test engines may be utilized to perform testing tasks on a device and/or devices under analysis. Each test engine may perform all or a portion of a testing task. The test engines may be directed by a controller and a control database. The control database may store one or more control documents for configuring, instructing and/or receiving the results of testing tasks performed by the test engines. Some or all of the control documents may be test engine-specific, while others may be specific to a particular group of test engines. The controller may update the control documents at the control database to manage the operation of the test engines. For example, the controller may change or update a configuration, assign a test engine to a group, assign a testing task to one or a group of test engines, etc. Upon completion of a testing task and/or after generating reportable result data, the test engines may record results at the one or more control documents, where it may be accessible to the controller. According to various example embodiments, the test engines may access the control database via an application program interface (API) that may be integral to the control database and/or may be implemented as a network protocol wrapper and/or interface wrapper. The API may be programmed to enable communication with the control database (e.g., by the controller and/or the test engines) via a communication protocol, such as a hypertext transfer protocol (HTTP). For example, the API may receive instructions that may be used from the controller and/or the test engines to access (e.g., read and/or write to) documents stored at the control database.

Figure 1:
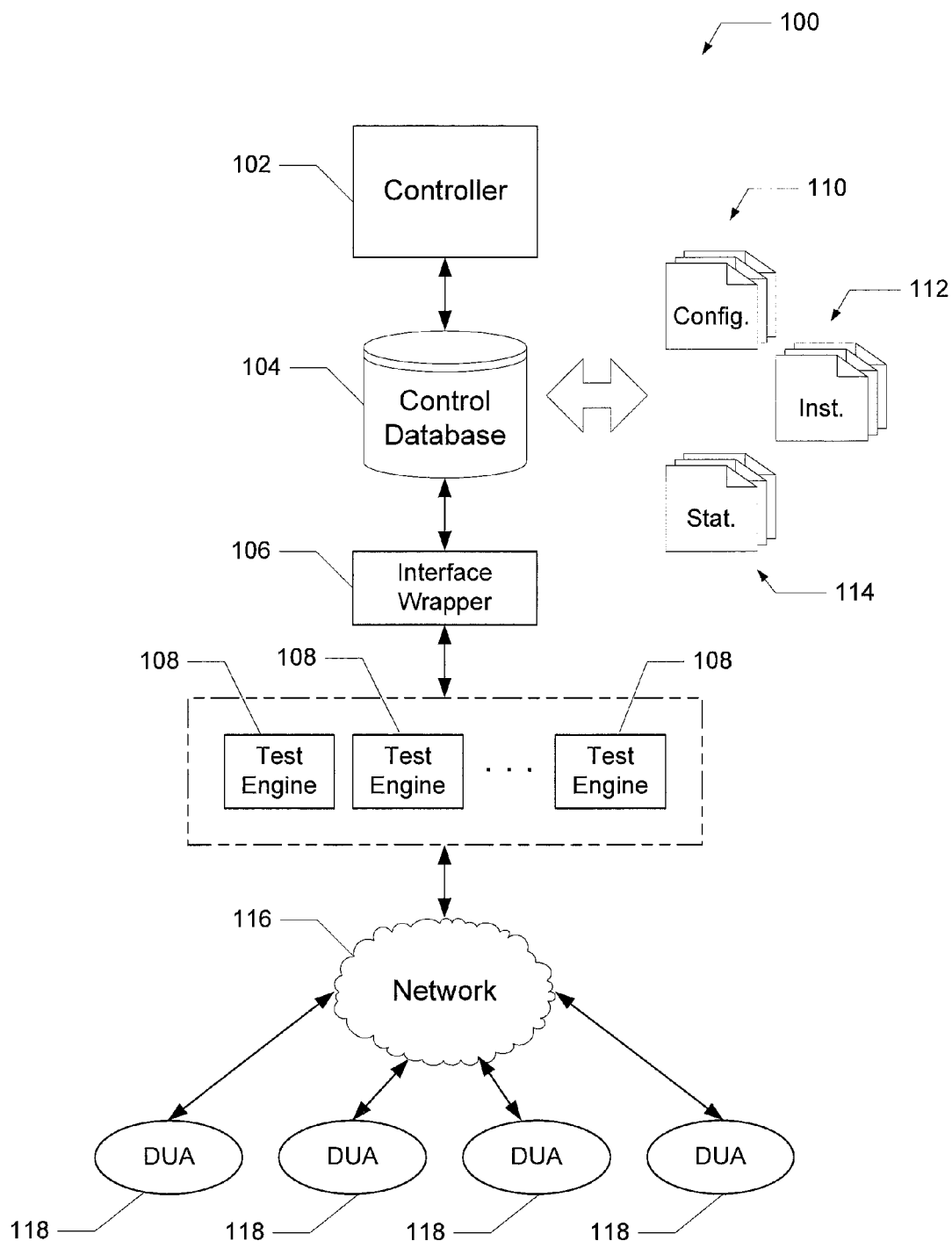
FIG. 1 illustrates one example embodiment of a system for distributed testing.

FIG. 1 illustrates one example embodiment of a system 100 for distributed testing. The system 100 may comprise a plurality of test engines 108 for performing testing tasks. Testing tasks may comprise various tasks that monitor and/or actively test one or more devices under analysis (DUA) 118. The DUA's 118 may represent software and/or hardware. Software may include, for example, applications, operating systems, and/or communications systems. Hardware may include, for example, one or more computer devices. A computer device may be, for example, a switch, a bridge, a router (including wireline or wireless), packet filter, firewall (including stateful or deep inspection), Virtual Private Network (VPN) concentrator, Network Address Translation (NAT)-enabled device, proxy (including asymmetric), intrusion detection/prevention system, network protocol analyzer, etc. A DUA 118 may also be multiple devices that are communicatively coupled to form a system or network of devices. For example, a DUA 118 may be two firewall devices that establish an encrypted tunnel between themselves. Different DUA's 118 may communicate with one another via a network 116 although it will be appreciated that, in various example embodiments, the network 116 may form all or a part of a DUA 118.

Example testing tasks to be performed on DUA's 118 may include, for example, monitoring tasks (e.g., Secure Shell (SSH) channel monitoring, Simple Network Management Protocol (SNMP) monitoring, protocol instrumentation, etc.), or interactive tasks (e.g., concurrency scale tests, network performance tests, fuzz tests, etc.). Some testing tasks may be performed individually by a single test engine 108, while other testing tasks may be performed collectively by multiple test engines 108 working in conjunction with one another. According to various example embodiments, each test engine 108 may be implemented as a software element (e.g., a program or script) executed by one or more computer devices. In various example embodiments, a single computer device may implement multiple test engines 108. The test engines 108 may be in communication with the one or more devices under analysis 118 via a network 116, which may be any suitable form of local and/or wide area network.

Operation of the test engines 108 may be controlled by a controller 102 utilizing a control database 104. The control database 104 may comprise various documents 110, 112, 114 for providing instructions to the test engines 108 and receiving results of testing tasks performed by the test engines 108. The test engines 108 may access the documents 110, 112, 114 via an API 106. For example, the API 106 may provide access to the control database 104 to the controller 102 and the plurality of test engines 108. For example, the API may process instructions from the controller 102 and/or the test engines 108 to read and/or write to the various documents 110, 112, 114, as described herein. According to various example embodiments, functionality for implementing the API 106 may be integral to the control database 106 or, in various example embodiments, may be coded as a separate interface wrapper 106. The API 106 may provide access to the control database 104 according to any suitable protocol. In some example embodiments, the API 106 may utilize Hypertext Transfer Protocol (HTTP). For example, HTTP protocol communications may take place on port eighty (80), allowing communications between the test engines 108 and the control database 104 through network firewalls. In some example embodiments, other firewall capable protocols and/or configurations may be used. Also, in various example embodiments, the API 106 may be implemented to respond to requests consistent with Representational State Transfer (REST) constraints (e.g., the API may be RESTful). The test engines 108 may access the control database 104, for example, via a network that may be the network 116 or may be a separate network (e.g., as described herein). One example of a database including an integral API is the CouchDB available from the Apache Software Foundation.

Figure 2:
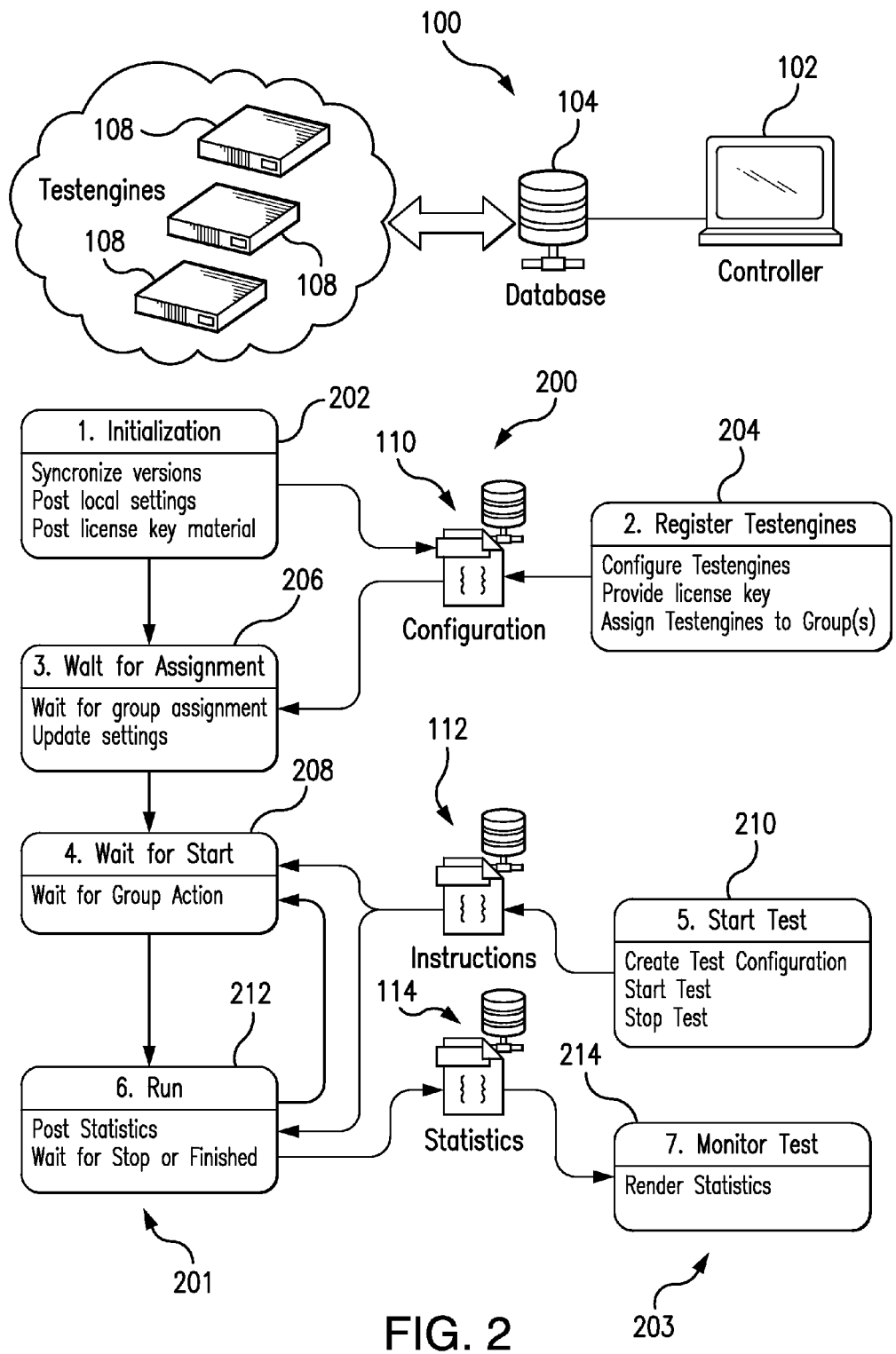
FIG. 2 shows a chart illustrating one example embodiment of a process flow for executing testing tasks utilizing one or more test engines of the system of FIG. 1.

FIG. 2 shows a chart illustrating one example embodiment of a process flow 200 for executing testing tasks utilizing one or more test engines 108. FIG. 2 also illustrates a portion of the system 100 corresponding to actions of the process flow 200 that are performed by or on different components of the system 100. For example, the process flow 200 of FIG. 2 is illustrated in two columns 201 and 203. The actions described in column 201 may be performed by one or more of the test engines 108, which are illustrated above column 201. Similarly, the actions described in column 203 may be performed by one or more of the controller 102 and/or the control database 104, which are illustrated above column 203. Further, various actions may be performed on the various documents 110, 112, 114 stored at the control database 104, as illustrated. As described herein, writing to or populating a document, such as one of the documents 110, 112, 114, may include writing information to a pre-existing instance of the relevant document, creating a version of the document and writing to the newly created document, copying a previously created version of the document from one storage location to another, etc.

At 202, the test engines 108 may be initialized, for example, utilizing one or more configuration documents 110. According to various example embodiments, each test engine 108 may have a configuration document 110 or a portion thereof, describing a configuration status of the test engine 108. Configuration documents 110 may be unique to a single test engine 108 and/or shared among multiple test engines 108. The configuration documents 110 may be populated (e.g., written to) by assigned test engines 108, the controller 102 or both. For example, the test engine 108 may provide current configuration information including, for example, information about the platform on which it is running, the version of the software that it is currently executing and its boot time. The controller 102 may provide other information including, for example, a group assignment, an update interval (e.g., an interval at which the test engine 108 should update the configuration document 110) and logging settings. Also, for example, the controller 102 may write to the configuration document 110 a software version and/or operating parameter that the associated testing engine 108 should execute.

At initialization, each test engine 108 may access its configuration document 110 and may make appropriate modifications and/or updates to initialization parameters. Example initialization parameters may comprise test engine versions, test engine local settings, license key material, and time synchronization. For example, a test engine 108 may access its configuration document 110 and write a current version identification (for the test engine 108 itself and/or a component thereof). If the controller 102 has written a new version of the test engine 108 or any of its components to the configuration document 110, the test engine 108 may download and install updated software matching the version identifier or identifiers from the configuration document 110. Similarly, the test engine 108 may report various local settings to the configuration document 110, and retrieve any desired setting changes indicated by the controller 102 (e.g., as described at 204 below).

According to various example embodiments, initializing a test engine 108 may also involve the exchange of license key material. For example, the control database 104 may require each test engine 108 to produce license key material before allowing the test engine 108 to access a configuration document 110 or other document. In this way, the controller 102 and database 104 may ensure that only authorized test engines 108 have access to the system 100 and that all test engines 108 with access to the system are properly licensed. Similarly, in some example embodiments, a test engine 108 may require license key material from the controller 102 before accepting initialization data. For example, the test engines 108 may be programmed to avoid accepting instructions from controllers 102 that are not authorized. In various example embodiments, the controller 102 may deposit its license key material at the database 104 in a location accessible to the appropriate test engine. License key material may include any suitable type of authentication and/or security data including, for example, a digital certificate, a piece of data encrypted with a private key of the test engine 108 and/or controller, etc. Also, in various example embodiments, license key material may be communicated between the test engines 108 and controller 102 via the control database 104 (e.g., via the configuration documents 110).

According to various example embodiments, time synchronization may also occur at about the time of initialization 202. For various testing tasks, it may be desirable for all or a portion of the test engines 108 to start a task, complete a task and/or perform a given intermediate task step at the same time. Accordingly, some or all of the test engines 108 may receive time or clock synchronization data. The synchronization data may be periodically written to the configuration documents 110. Such data may comprise a link or pointer to a clock. In some example embodiments, synchronization data may comprise a reference to a system clock of a computer device implementing the database 104 that may have been, for example, synchronized with that of a computer device implementing the controller 102. Upon receiving synchronization data, each test engine 108 may set a system clock of the computer device executing the test engine 108 and/or record an offset relative to the system clock. It will be appreciated that synchronization events may occur at other times in addition to or instead of at initialization 202. For example, each test engine 108 may periodically perform a time synchronization in order to maintain synchronization across all engines.

According to some example embodiments, the configuration document 110 for a test engine 108 may comprise an indication of group assignment for the test engine 108 at the time of initialization 202. Accordingly, the test engine 108 may read its group assignment from the configuration document 110 at initialization and subsequently access its group instruction document 112, as described below at 208. In other example embodiments, a test engine's configuration document 110 may not indicate a group assignment at initialization 202. For example, this may occur when the test engine 108 is newly added to the system 100 and before the controller 102 has assigned the test engine 108 to a group.

Timing of the initialization 202 of a test engine 108 may be determined according to any suitable method. For example, according to various example embodiments, a test engine 108 may initialize upon start-up. If no configuration document 110 exists for the test engine 108 at the time of initialization, the control database 104 and/or the controller 102 may create a document 110, for example, as described herein below at 204. Also, in various example embodiments, initialization may occur for a test engine 108 after the test engine 108 has completed an assigned testing task. Additionally, in some example embodiments, initialization may occur upon an update to the configuration document 110 or portion thereof associated with the test engine 108. For example, in some example embodiments, the interface wrapper 106 and/or other component of the system 100 (e.g., the controller 102, the database 104, etc.) may be configured to alert a test engine 108 when its associated configuration document 110 is modified. This may prompt the test engine 108 to access the configuration document 110 (e.g., to begin an initialization).

At 204, the controller 102 may register each test engine 108, for example, by updating initialization parameters for the test engines 108 at the appropriate configuration documents 110. Accordingly, the controller 102 may synchronize and/or manage the version of each test engine 108 and/or each of the components thereof as well as test engine local settings. In addition, registration of a test engine at 204 may also comprise assigning the test engine 108 to a group. Each group may comprise one or more test engines 108 to be used to perform a common task. For example, if the controller 102 is to implement a testing task such as a fuzz test, the controller 102 may determine the number of test engines 108 required to implement the fuzz test and then assign that number of available test engines 108 to a group for performing the fuzz test. The controller 102 may assign a test engine 108 to a group by writing an indication of the group to a configuration document 110 associated with the test engine 108. The indication of the group may comprise an indication of an instruction document 112 associated with the group and/or the testing task to be performed.

At 208, a test engine 108 that has been assigned to a group may retrieve task instructions from the instruction document 112 of the group and wait for group action to begin. For example, the task instructions may comprise a description of the task including, for example, a time that the task is to begin and, when appropriate to the task, a time when the task is to end. Other example task instructions may include specific parameters of the task (e.g., protocols to use for protocol monitoring or instrumentation, mutation forms to use for test attacks, etc.). In some example embodiments, task instructions may also include a script or software code for performing the testing task and/or a universal resource locator (URL) pointing to the script or software code. The controller 102 may populate the instruction document 112 at 210. According to various example embodiments, the control database 104 and/or the controller 102 may be configured to send an indication to group members upon modification of the instruction document 112. This may indicate to the group members that they should access the instruction document 112 to update their operating parameters. In some example embodiments, the test engines 108 may be configured to periodically access the instruction document 112 to check for updates (e.g., at an interval set by the controller 102 and recorded at the instruction document 112). Although the description herein describes a single instruction document 112 accessed by multiple test engines 108 assigned to a common group, it will be appreciated that, in some example embodiments, each test engine 108 may comprise a dedicated instruction document 112 describing the actions to be performed by the test engine. Also, for example, task information for each test engine 108 may be stored at the configuration document 110 associated with the test engine 108.

Upon reaching the start time, each test engine 108 in a group may begin to execute the testing task indicated by the instruction document 112 at 212. Results of the testing task may be posted back to the control database 102, for example, at one or more statistics documents 114. Results may be written to the statistics document 114 either during the testing task or at the completion of the testing task. Execution of the testing task may continue, for example, until the task is complete, until a scheduled end time for the task has arrived and/or a until a stop order is given by the controller 102. For example, the controller 102 may write a stop order to an instruction document 112. The test engine or engines 108 implementing testing task to be stopped may cease their operation, either upon checking the instruction document 112 or upon receiving notification from the database 104, the controller 102 and/or the API 106 that the modification has occurred. Upon completion of a testing task, a test engine 108 may re-initialize at 202, wait for an additional group instruction to be written to the instruction document 112, and/or perform any other suitable action.

The controller 102 may monitor results of the testing tasks by monitoring the statistics document or documents 114. According to various example embodiments, the controller 102 may perform additional analysis based on the results of the testing tasks. For example, for protocol monitoring tasks, the controller 102 may determine if a protocol error has occurred. For simulated attack testing tasks, the controller 102 may determine whether a particular attack has been successful. In various example embodiments, the additional analysis described herein may be performed by the individual test engines 108 and reported directly to the statistics document 114. The controller 102 may, in some example embodiments, provide a user interface to a user reflecting results of the testing tasks during and/or after completion of the tasks.

FIG. 3 illustrates a representation of one example embodiment of a configuration document 110 for a single test engine 108. The configuration document 110 may comprise an identification field 302 indicating the test engine 108 associated with the document 110. A revision field 304 may indicate the revision level of the configuration document 110. For example, the revision level of the document 110 may be updated when the document 110 is modified (e.g., by the test engine 108 and/or the controller 102). A version field 305 may indicate a version level of the test engine 108 and/or a desired version level to which the test engine 108 should revise itself. An about field 306 may indicate information describing a platform (e.g., computer device, operating system, etc.) on which the test engine 108 is executing. A boot time field 308 may indicate a time when the test engine 108 was booted. A group field 310 may indicate a group to which the test engine 108 is (or has been) assigned (e.g., by the controller 102). A log level field 314 and logging field 316 may indicate parameters describing how the test engine 108 will log results of the testing tasks that it performs (e.g., to the statistics document 114). A running field 318 may indicate whether the test engine 108 is currently running a testing task and may, for example, be updated by the test engine 108. For example, as illustrated in FIG. 3, the running field 318 has a value of "true" indicating that the test engine 108 is current running a testing task. A timestamp field 320 may indicate a time corresponding to the last modification of the configuration document 110. A type field 322 may indicate a type of the test engine 108. It will be appreciated that, in some example embodiments, the configuration document 110 may include additional fields (not shown) and/or omit some of the shown fields.

As described herein, the various fields of the configuration document 110 may be modified by the controller 102 and/or the test engine 108. For example, fields that may be maintained by the test engine 108 may include the about field 306, the version field 305, the boot time field 308 and the running field 318. The controller 102 may maintain the group field 310, the interval field 312 and the logging setting fields 314, 316. The configuration document 110 may be read by the test engine 108 during initialization and, for example, when no testing tasks are running. Similarly, the controller 102 may update the configuration document 110 during idle time (e.g., when no testing tasks are executing).

FIG. 4 illustrates a representation of one example embodiment of an instruction document 112 for a group of test engines 108. The instruction document 112 may be updated by the controller 102. An identification field 402 may identify the document 112. For example, the identification field 402 as shown in FIG. 4 indicates that the document 112 shown is an instruction set for group "a". A revision field 404 may indicate a revision number for the document 112. For example, each test engine 108 may periodically monitor the instruction document 112 to detect changes. A change in the revision field 404 may indicate a change in the instruction document 112 that may be relevant to the test engine 108. An action field 406 may indicate the type of testing task to be performed by the group of test engines 108. Alternatively, the controller 102, the control database 104 and/or the API 106 may be configured to automatically notify test engines 108 belonging to the relevant group upon a change to the instruction document 112. A group field 408 may indicate the group of test engines 108 that the document 112 relates to. An interval field 410 may indicate an interval at which the test engines 108 are to record statistics (e.g., to the statistics document 114) and statuses (e.g., to the configuration document 110). According to various example embodiments, the controller 102 may modify the values in these fields 408, 410, based on the number of test engines 108 in operation. For example, as the number of test engines 108 increases, intervals at fields 408, 410 may increase in order to reduce network traffic.

A job identification field 412 may indicate an identification of the testing task to be performed by the test engines 108. Run parameter field 414 may indicate instructions to the test engines 108 for performing the tasking including, for example, a script for executing all or a portion of the testing task and/or a universal resource locator (URL) indicating the location of a script for executing all or a portion of the testing task. A start time field 416 may indicate when the testing task is to start. When the clocks of the respective test engines 108 are synchronized, having a common start time may provide the ability to start multiple test engines 108 (e.g., test engines 108 in a common group) on a testing task simultaneously. A type field 418 indicates a type of the document 112 (e.g., instruction document).

According to various example embodiments, each group of test engines 108 (e.g., as defined by the controller 102) may have an instruction document 112, such as the document 112 shown in FIG. 4. The instruction document 112 may be read by the test engines 108, for example, when no testing tasks are executing. In some example embodiments, the instruction document 112 may comprise instructions for a single test engine 108, or instructions for test engines 108 from more than one execution group.

FIG. 5 illustrates a representation of one example embodiment of a statistics document 114. The statistics document 114 may receive statistics received from one or more test engines 108 as the result of a testing task. According to various example embodiments, a test engine 108 may update the statistics document 114 once per reporting interval (e.g., as defined by the controller 102 and set forth in the relevant instruction document 112) or, in various example embodiments, may create a new statistics document 114 during every reporting interval. In some example embodiments, results from multiple test engines 108 may be stored at a single statistics document 114.

The statistics document 114 illustrated in FIG. 5 comprises an identification field 502 that identifies the statistics document and a revision field 504 that indications a revision level of the document. A bot identification field 506 may identify the test engine 108 or test engines 108 that record testing task results to the document 114. A group field 508 may indicate a group identification of the test engines 108 that record testing task results to the document 114. The status field 510 may comprise one or more fields for receiving statistics data from the test engine 108 or test engines 108. A timestamp field 512 may indicate the last time that the document 114 was updated and a type field 514 may indicate the type of document (e.g., a statistics or status document 114).

Different computer systems components described herein (e.g., the controller 102, control database 104, test engines 108 and devices under analysis 118 may be executed by computer devices in communication with one another according to any suitable method. For example, in some example embodiments, some or all of the computer systems described herein may be in communication with one another via a network or networks. The network or networks may operate according to any suitable wired or wireless communication protocol and may utilize any suitable hardware or software. In some example embodiments, the network or networks may include, a wide area network (WAN) such as the Internet, a local area network (LAN), etc.

The various documents described herein 110, 112, 114 may be stored at the control database 104 in any suitable manner and according to any suitable file system and/or file structure. For example, each instance of a document 110, 112, 114 may be a distinct file at the control database 104. Also, in some example embodiments, one or more instances of the documents 110, 112, 114 may be stored in a single logical file at the control database 104. For example, configuration documents 110 and statistics documents 114 corresponding to a single test engine 108 may be stored in the same logical file. It will be appreciated, however, that documents 110, 112, 114 may be logically arranged into files in any suitable manner. In various example embodiments, the various documents described herein, 110, 112, 114 may be data stored in any suitable non-transitory form according to a defined structure.

Figure 6:
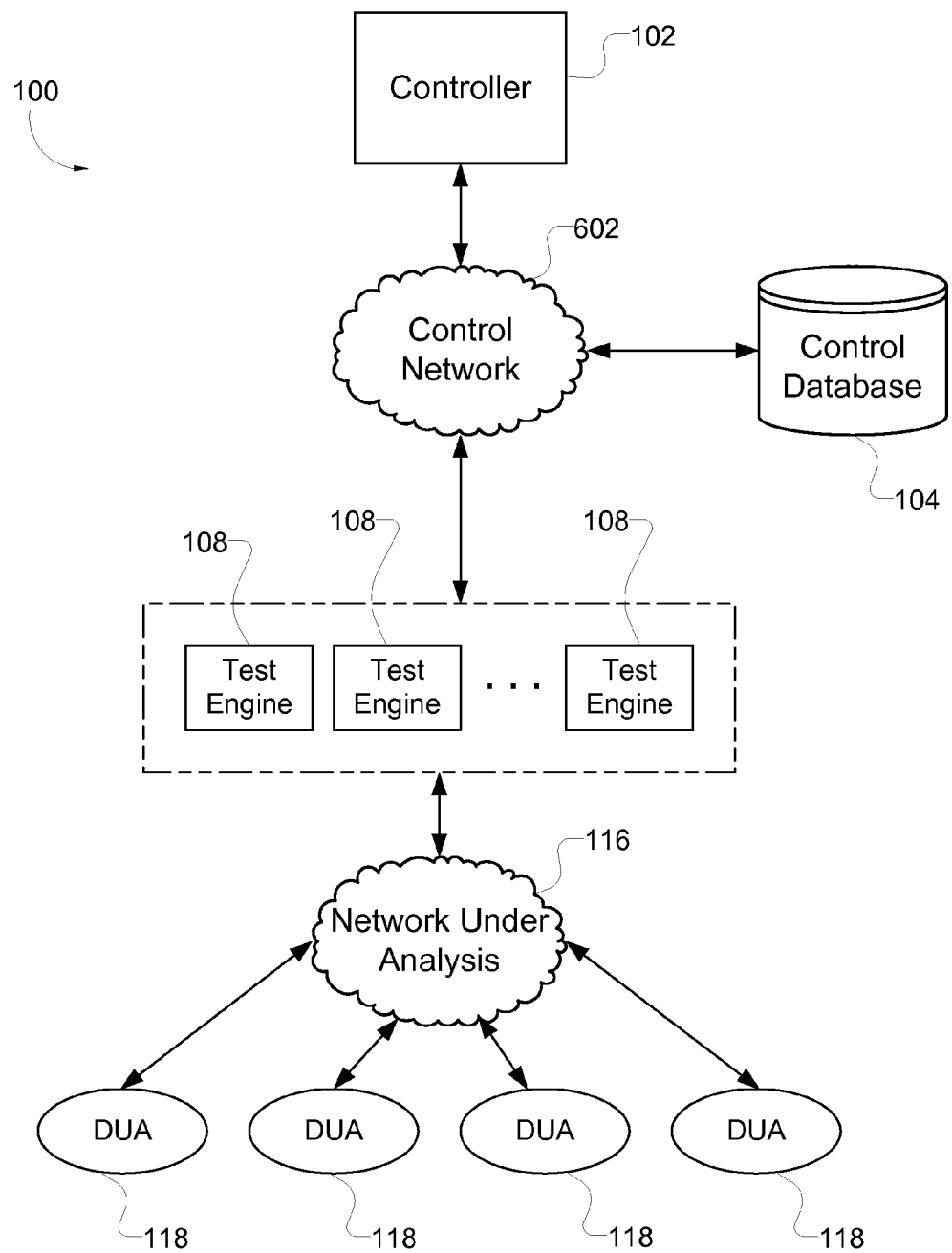
FIG. 6 shows one example embodiment of the system of FIG. 1 configured with a separate control network.

FIG. 6 shows one example embodiment of the system 100 configured with an optional separate control network 602. According to various example embodiments, the DUA's 118 may operate on a network 116 that is also under test. For example, various testing tasks performed by the test engines 108 may be designed to test parameters of the network 116 in addition to or instead of the devices under analysis 118. It will be appreciated that some or all of these testing tasks are capable of, and may be designed to cause the network 116 to fail. It will be appreciated that if the test engines 108, controller 102 and control database 104 also rely on the network 116 to communicate with one another, failure of the network 116 may precipitate a general failure of the system 100 to continue conducting and reporting testing tasks. Accordingly, as illustrated in FIG. 6, a control network 602 may be provided to handle communications between the controller 102, control database 104 and test engines 108. The control network 602 may be independent and/or separate from the network under analysis 116 such that failure of the network under analysis 116 does not substantially affect communications via the control network 602. For example, the controller 102 may receive an indication indicating a failure of the network 116 (e.g., as a result of a testing task performed by one or more of the test engines). Upon receiving the indication of the failure of the network 116, the controller 102 may continue to communicate with the test engines 108 via the control network 602 and control database 104. For example, the controller 102 may modify the various documents 110, 112, 114 in order to, for example, stop the operation of one or more testing engines 108 (e.g., engines 108 that cannot complete their testing tasks due to network failure). Also, in some example embodiments, the controller 102 may instruct one or more test engines 108 or groups of test engines 108 to begin a diagnostic task directed to determining the reason for the failure of the network 116.

Figure 7:
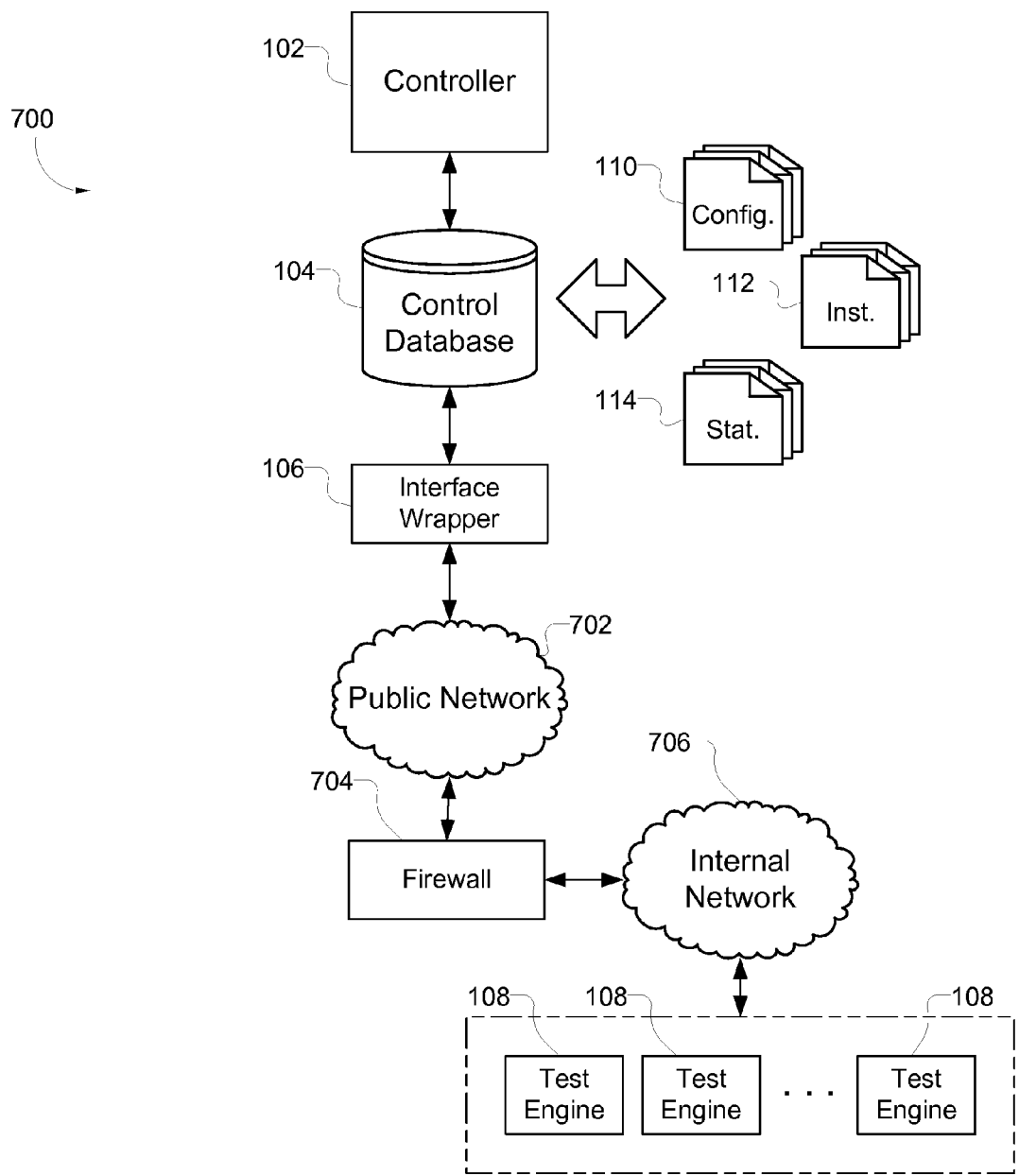
FIG. 7 illustrates another example embodiment of the system of FIG. 1 configured with the controller operating on a first network and the test engines operating on a second network.

FIG. 7 illustrates another example embodiment of the system of FIG. 1 configured with the controller operating on a first network (e.g., public network 702) and the test engines 108 operating on a second network (e.g., an internal network 706). The public network 702 may be any network for handling communications to and from the control database 104 (e.g., via the interface wrapper 106). For example, the public network 702 may be and/or comprise all or a portion of the Internet. The internal network 706 may be, for example, a local area network (LAN) implemented, for example, by a company or organization desiring the testing of DUA's 118 (not shown in FIG. 7). A firewall 704 may separate the public network 702 and the internal network 706. According to various embodiments, the test engines 108 may open a connection to the control database 104 during initialization. For example, further communications between the control database 104 and the internal network 706 may be initiated by the test engines 108. Communications between the test engines 108 and the control database 104 may occur via the firewall 704. Any suitable method may be used to allow the test engines 108 behind the firewall 704 to communication with the control database 104. For example, in some embodiments, communications between the test engines 108 and the control database 104 may be configured according to the Hypertext Transfer Protocol (HTTP), for example, utilizing a network port that the firewall 704 will permit to make outward-directed requests. Examples of such ports may include, for example, Trusted Network Ports, such as port 80 or port 443. According to various embodiments, if the internal network fails (e.g., due to testing activities of test engines 108), then the test engines 108 may end their current test operation and wait for the connection to the control database 104 to be restored.

Figure 8:
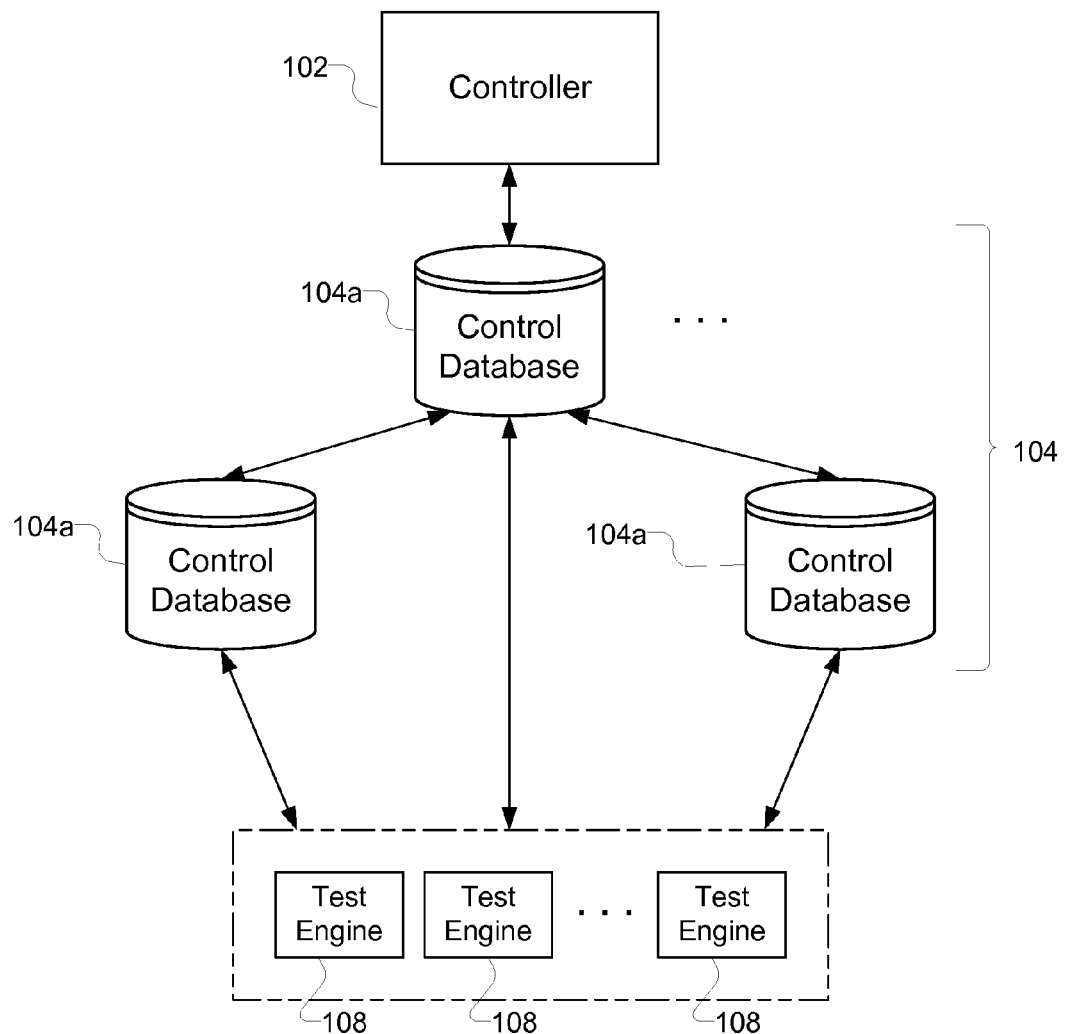
FIG. 8 illustrates one example embodiment of the system of FIG. 1 with the control database implemented as a series of clustered database elements.

FIG. 8 illustrates one example embodiment of the system 100 with the control database 104 implemented as a series of clustered database nodes 104a. The clustered database nodes 104a may be implemented according to any suitable clustered database format. For example, the database nodes 104a may be configured according to a shared-everything scheme where each node 104a has access to all of the data collectively stored at the control database 104 (e.g., control documents 110, instruction documents 112 and/or statistics documents 114). Each node 104a may comprise a separate wrapper interface 106 (not shown in FIG. 8) and/or may comprise functionality for forming separate connections to the test engines 108. In this way, the number of possible connections between the database 104 and the test engines 108 may be increased. For example, this may allow reductions in the intervals at which the test engines 108 check associated configuration documents 110 and instruction documents 112. Alternatively, the database nodes 104a may be configured according to a shared-nothing scheme, where each node 104a has responsibility for a defined portion of the data collectively stored at the database 104 (e.g., configuration documents 110, instruction documents 112 and/or statistics documents 114 for a defined set of test engines 108). For example, each test engine 108 may have a configuration document 110, instruction document 112 and one or more statistics documents 114 stored at a single database node 104a. The database nodes 104a may have distributed network locations and test engines 108 may be assigned to database nodes 104a based on logical proximity. In this way, total communication traffic may be reduced as the network distance traversed by messages between database nodes 104a and test engines 108 may be reduced. In some example embodiments, database nodes 104a may be assigned to test engines 108 based on functionality. For example, a database node 104a may be assigned all of the test engines 108 in one or more groups.

According to various example embodiments, the testing tasks performed by the test engines 108 may be of any suitable type. For example, one or more test engines 108 may be configured, as described herein, to perform monitoring tasks and interactive tasks. In monitoring testing tasks, the test engines 108 may observe the devices under analysis 118 and record properties describing the devices under analysis 118. In various example embodiments, each DUA 118 may be observed by a separate test engine 108 and/or by multiple test engines 108. In interactive tasks, the test engines 108 may interact with the devices under analysis 118 to observe the response and/or find a limit of the capabilities of the devices under analysis 118.

Examples of monitoring testing tasks may include Secure Shell (SSH) channeling monitoring, Simple Network Management Protocol monitoring, and Protocol Instrumentation. According to SSH channel monitoring, one or more test engines 108 may connect to a DUA 118 and execute a periodic command for the purpose of establishing system health. The command may, for example, check a status of a process, a level of central processor unit (CPU) utilization, a level of memory utilization, etc. The connection between the one or more test engines 108 and the DUA 118 may be made according to an SSH channel. According to SNMP monitoring, one or more test engines 108 may collect statistics from a Management Information Base of a DUA 118. Example statistics may include, for example, CPU and memory utilization, error counts, etc. According to Protocol Instrumentation, one or more test engines 108 may collect statistics and/or flag errors encountered during periodic checkpoint exchanges with the DUA 118 using valid protocol transactions. Although each of the monitoring testing tasks is described herein with reference to a single DUA 118, it will be appreciated that these testing tasks may be ramped up using multiple test engines 108 (e.g., a group of testing engines 108). For example, a group of test engines 108 may be assigned a testing task requiring the group to monitor a corresponding group of devices under analysis 118.

Interactive testing tasks may generally comprise testing tasks where the test engine 108 or engine 108 provide simulated interactions (e.g., communications and/or connections) with the devices under analysis 118 to test the capacity and/or security of the devices under analysis 118. Utilizing groups of test engines 108 to perform load testing may increase the volume and/or the variety of types of communications and/or connections that may be sent to and/or initiated with the devices under analysis 118. Examples of interactive testing tasks include concurrency scale tests, network performance tests, fuzz tests as well as other load and/or security-related tests. According to concurrency scale tests, a test engine 108 or test engines 108 may generate high levels of connections to a DUA 118 utilizing various transport protocols including, for example Transmission Control Protocol (TCP), User Datagram Protocol (UDP) and Secure Sockets Layer (SSL). The test engines 108 may collect statistics for the attempted connections including, for example, pass rates, timeouts, errors, latencies, etc. According to network performance testing tasks, the test engine 108 or engines may generate high levels of network traffic representing varied types of transactions. Statistics may be kept for bytes and packets sent and received on each interface.

According to a fuzz test, a test engine or engines 108 may generate invalid, unexpected and/or random data within the structure of one or more network protocols. The invalid, unexpected and/or random data is then provided to devices under analysis 118. The test engine or engines 108 may identify the types of invalid, unexpected or random data cause different devices under analysis 118 to fail, thus identifying vulnerabilities of the devices under analysis 118. Invalid, unexpected and/or random data may be generated in any suitable manner. Different types of fuzz testing tasks may include structure attacks, semantics attacks and state attacks. According to a structure attack, the test engines 108 generate messages that contain values and/or parameters that violate an intended protocol. Types of structure attacks include, for example, empty-field, empty-message, extra-data, incomplete, invalid-count, invalid-enum (enumeration), invalid-eol (end-of-line), invalid-field, invalid-index, invalid-length, invalid-offset, invalid-syntax, invalid-type, invalid-utf8 (Unicode Transformation Format), missing-data, missing-field, mixed-case, overflow, repeated-field, too-many-fields, truncated, underflow, wrong-encoding, fmt-string (format), fragmented-field, invalid-encoding, invalid-field, invalid-ip (IP address), invalid-path, invalid-string, recursion, self-reference, and null-char (character), etc.

According to a semantics attack, the test engines 108 may send the devices under analysis 118 messages that are technically correct, but nonetheless unexpected. For example, one type of semantics attack may involve a message that indicates an invalid (e.g., non-existent) resource, such as a printer. This can cause the DUA 118 to hang or crash unexpectedly. Another example of a semantics attack may be a network packet with a source Internet Protocol (IP) address of "all-broadcast." If the DUA 118 were to respond to such a packet, it would generate enough packets to flood the network. According to a state attack, the test engines 108 may generate messages that are semantically correct, but incorrect based on the expectations of the device. For example, one type of state attack may involve the test engines 108 sending messages that are out-of-order (e.g., with respect to the type of message the DUA 118 is expecting to receive).

Other types of interactive testing tasks may involve general tests of the overall security of the device or devices under analysis 118. Examples of such tasks may include, for example, negotiating a lower (e.g., less secure) encryption algorithm, dictionary attacks (brute forcing commonly-used passwords), resource exhaustion, identifying misconfiguration of the DUA 118, identifying mechanisms for sending messages through the DUA 118 that bypass various security checks, and detecting insecure implementations of standard protocols and information disclosure.

Various communications are described herein between computer and/or software components such as, for example, the controller 102, the control database 104, the test engines 108 and the API 106. When communications between computer components takes place over the Internet or other public network, it will be appreciated that these communications may be encrypted. For example, one or more of the systems may utilize an asymmetric or public key infrastructure (PKI) method. According to a PKI system, each system may have a public key that may be used for encrypting messages and a private key that may be used for decryption. The public key may be provided to any systems having need to send data to the first system. The data may be encrypted with the public key such that it may only be decrypted with the private key, which may be kept secret by the receiving system. In this manner, all communications between the various systems may be decrypted only by their intended recipients.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, methods or processing structures described herein are necessarily intended to limit the scope of the invention. Also, while specific testing applications have been described herein, it will be appreciated that the applications provided according to the description herein may include other testing applications as well as non-testing applications.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused descriptions would not facilitate a better understanding of the present invention, and therefore, a more detailed description of such elements is not provided herein.

Moreover, the processes associated with the present example embodiments may be executed by programmable equipment, such as computers. Software or other sets of instructions may be employed to cause programmable equipment to execute the processes. The processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, any non-transitory media such as, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. It will be appreciated that the term non-transitory refers to the medium and not to any data stored thereon. For example, a random access memory (RAM) is non-transitory, although the data stored thereon may change regularly.

A "computer," "computer device," "machine," "computer device," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed example embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various example embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers or computer systems described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

Various example embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various example embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various example embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (e.g., end-to-end). A device that operates simultaneously at more than one of these layers can be considered a multilayer switch. In certain example embodiments, routers or other like networking devices may be used to forward data packets between networks using headers and forwarding tables to determine an optimum path through which to transmit the packets.

As employed herein, an application server may be a server that hosts an API, such as the API 106, to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While various example embodiments of the invention have been described herein, it should be apparent, however, that various modifications, alterations and adaptations to those embodiments may occur to persons skilled in the art with the attainment of some or all of the advantages of the present invention. The disclosed example embodiments are therefore intended to include all such modifications, alterations and adaptations without departing from the scope and spirit of the present invention as set forth in the appended claims.

I claim:

1. A system for managing a plurality of distributed test engines to test at least one device under analysis (DUA), the system comprising:
at least one computer device comprising a processor and associated memory, wherein the at least one computer device is programmed to execute a controller; and
a control database stored on a data storage device in communication with the at least one computer device, wherein the control database is also in communication with the controller and with at least a portion of the plurality of test engines via an application program interface (API), and wherein the control database comprises stored thereon:
a plurality of configuration documents, wherein each configuration document is associated with at least one of the plurality of test engines, and wherein each configuration document indicates an execution group of the associated at least one test engine;
a plurality of instruction documents, wherein each instruction document is associated with an execution group, wherein each execution group comprises a portion of the plurality of distributed test engines, and wherein each instruction document comprises an indication of a testing task to be performed by the execution group associated with the instruction document;
at least one statistics document for storing output from the plurality of test engines;
wherein the controller application is configured to:
write to the plurality of configuration documents to assign each of the plurality of test engines to an execution group; and
write to the plurality of instruction documents to provide, for each execution group, a testing task to be performed by test engines of the execution group on the at least one DUA; and
wherein the control database is configured to receive via the API and from at least a portion of a plurality of test engines an update to the at least one statistics document.

2. The system of claim 1, wherein at least two of a first configuration document associated with a first test engine selected from the plurality of test engines, an instruction document associated with an execution group comprising the first test engine and a statistics document associated with the first test engine are stored at the control database in a common file.

3. The system of claim 1, wherein the indication of the testing task to be performed by the execution group comprises a script to be executed by the test engines of the execution group to perform the testing task.

4. The system of claim 1, wherein the indication of the testing task to be performed by the execution group comprises a universal resource locater (URL) pointing to a script to be executed by test engines of the execution group to perform the testing task.

5. The system of claim 1, wherein the indication of the testing task to be performed by the execution group comprises a start time for the testing task.

6. The system of claim 1, wherein the control database is a distributed database comprising a plurality of database nodes.

7. The system of claim 6, wherein a first portion of the plurality of configuration documents, a first portion of the plurality of instruction documents and a first portion of the plurality of statistics documents are assigned to a first node selected from the plurality of database nodes, and wherein a second portion of the plurality of configuration documents, a second portion of the plurality of instruction documents and a second portion of the plurality of statistics documents are assigned to a second node selected from the plurality of database nodes.

8. The system of claim 1, wherein the API is configured to receive requests from at least one of the controller and one of the plurality of test engines according to hypertext transfer protocol (HTTP).

9. The system of claim 1, wherein the API is implemented to respond to requests consistent with Representational State Transfer (REST) constraints.

10. The system of claim 1, wherein the at least one DUA are configured to communicate with one another via a first network, and wherein the controller, the plurality of test engines and the control database are configured to communicate with one another on a control network separate from the first network.

11. The system of claim 10, further comprising a firewall positioned between the first network and the control network.

12. The system of claim 10, wherein the controller application is also configured to:
receive an indication that at least a portion of the first network has failed; and
write to the control database over the control network after receiving the indication that at least the portion of the first network has failed.

13. A computer-implemented method for communicating with a plurality of distributed test engines for testing at least one device under analysis (DUA), the method comprising:
writing to a plurality of configuration documents at a control database by a controller executed by at least one computer device, wherein the controller is in communication with the
control database via an application program interface (API), wherein each of the plurality of configuration documents corresponds to one of the plurality of test engines, and wherein writing to the plurality of configuration documents comprises writing to each of the plurality of configuration documents an indication of an execution group associated with the corresponding test engine;
writing to a plurality of instruction documents by the controller, wherein each of the plurality of instruction documents corresponds to one execution group comprising at least one of the plurality of test engines, and wherein writing to the plurality of instruction documents comprises writing to each of the plurality of instruction documents an indication of a testing task to be performed by the corresponding execution group; and
receiving at the control database from at least one of the plurality of test engines an update to at least one statistics document stored at the control database, wherein the at least one statistics document stores output from the plurality of test engines.

14. The method of claim 13, wherein at least two of a configuration document corresponding to a first of the plurality of test engines, an instruction document corresponding to a first execution group including the first of the plurality of test engines and a statistics document associated with the first of the plurality of test engines are stored at the control database in a common file.

15. The method of claim 13, wherein the indication of the testing task to be performed by the corresponding execution group comprises a script to be executed by the test engines of the execution group to perform the testing task.

16. The method of claim 13, wherein the indication of the testing task to be performed by the corresponding execution group comprises a universal resource locater (URL) pointing to a script to be executed by test engines of the execution group to perform the testing task.

17. The method of claim 13, wherein the indication of the testing task to be performed by the corresponding execution group comprises an indication of a start time for the testing task.

18. The method of claim 13, wherein the control database is a distributed database comprising a plurality of database nodes.

19. The method of claim 18, wherein a first portion of the plurality of configuration documents, a first portion of the plurality of instruction documents and a first portion of the plurality of statistics documents are assigned to a first node selected from the plurality of database nodes, and wherein a second portion of the plurality of configuration documents, a second portion of the plurality of instruction documents and a second portion of the plurality of statistics documents are assigned to a second node selected from the plurality of database nodes.

20. The method of claim 13, wherein the API is configured to receive requests from at least one of the controller and one of the plurality of test engines according to hypertext transfer protocol (HTTP).

21. The method of claim 13, wherein the API is implemented to respond to requests consistent with Representational State Transfer (REST) constraints.

22. The method of claim 13, wherein the at least one DUA are configured to communicate with one another via a first network, and wherein the controller, the plurality of test engines and the control database are configured to communicate with one another on a control network separate from the first network.

23. The method of claim 22, further comprising the plurality of test engines communicating with the control database over a firewall positioned between the first network and the control network.

* * * * *